Oct. 8, 1968           F. KOCH ET AL          3,404,578
TRANSMISSION BELT OF THERMOPLASTIC POLYURETHANE AND
METHOD OF MAKING SAME
Filed May 2, 1966
FIG. 2
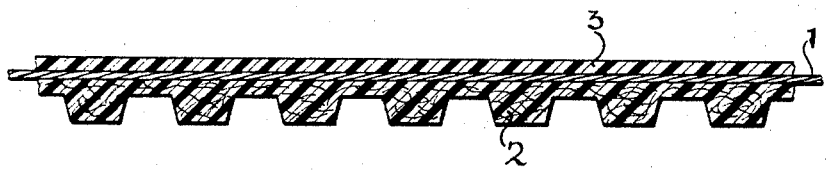
FIG. 1
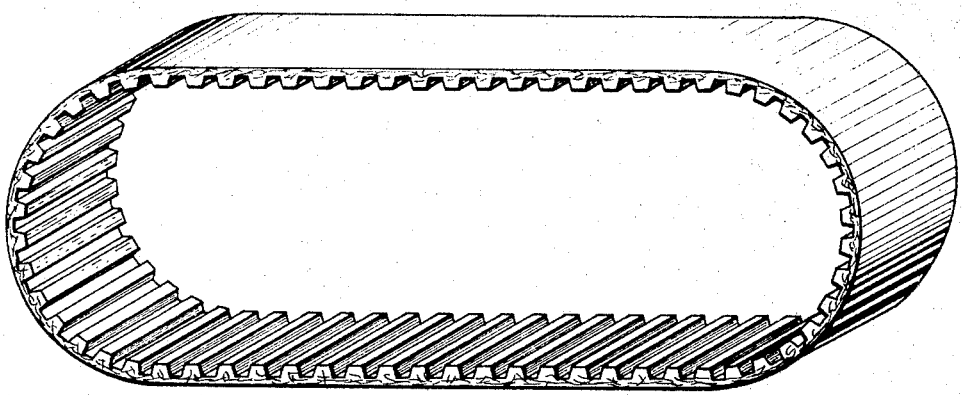
FIG. 3
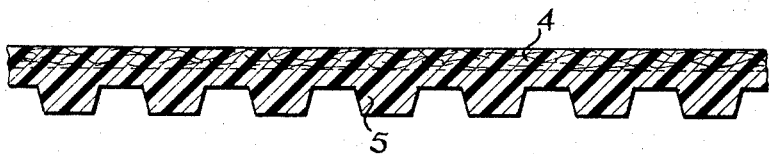
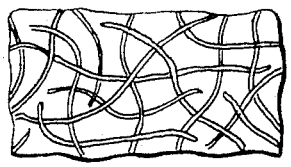
FIG. 4
INVENTORS:
Fritz Koch
Heinz Adolf Ludewig

3,404,578
TRANSMISSION BELT OF THERMOPLASTIC POLYURETHANE AND METHOD OF MAKING SAME

Fritz Koch, Dannenberg, and Heinz Adolf Ludewig, Hannover, Germany, assignors to Continental Gummi-Werke Aktiengesellschaft, Hannover, Germany
Filed May 2, 1966, Ser. No. 546,904
Claims priority, application Germany, May 29, 1965, C 35,992
4 Claims. (Cl. 74—231)

ABSTRACT OF THE DISCLOSURE

The present invention relates to a transmission belt, especially a flat belt with teeth which consists at least partially of polyurethane elastomers and is characterized primarily in that said elastomers have individual fibers in an at-random position substantially uniformly dispersed therein and firmly bound thereto.

---

The present invention relates to transmission belts with or without teeth of thermoplastic polyurethane. Transmission belts with or without teeth of rubber or synthetic material are customarily in view of their high stretchability provided with reinforcing inserts which are not at all or only very slightly stretchable or extensible. Such reinforcing inserts may consist for instance of metallic wires, or textile fabrics with corresponding stretch-resistant inserts such as glass fibers. In order to produce uniform conditions of extension within the belt body, definable inserts in the form of wires, braided wires or fabric are employed. Attempts to employ fiber fleece as reinforcing inserts have not yielded any satisfactory result in view of the insufficiently strong structure.

The manufacturing process of transmission belts of the above mentioned type is rather awkward and cumbersome in view of the required buildup of individual layers and the necessary preparation of the reinforcing inserts, particularly because first the strength carriers have to be introduced into the mold and steps have to be taken to assure that the location of these strength carriers or reinforcing inserts will not change while the elastic material is deposited thereon.

On the other hand, with transmission belts having teeth there exists the danger that a permanent deformation caused by conditions involving the material will occur within the range of the higher stressed tooth flanks which have to be taken into consideration when selecting polyurethanes, in conformity with the occurring loads so that highly interlinked types of polyurethanes had to be used which are not desired for other reasons.

It is, therefore, an object of the present invention to provide a transmission belt, especially a toothed flat belt, which will overcome the above mentioned drawbacks.

It is another object of this invention to provide a transmission belt as set forth above, which can be built up of polyurethane without requiring the heretofore necessary reinforcing means.

These and other objects and advantages of the invention will appear more clearly from the following specification in connection with the accompany drawings, in which:

FIG. 1 illustrates a toothed belt according to the invention which has been injection molded and is free from heretofore customarily used wires or cables serving as reinforcing inserts.

FIG. 2 illustrates in section a portion of a toothed transmission belt which in heretofore known manner is provided with reinforcing wires but in which the teeth have in conformity with the present invention interspersed therein fibers.

FIG. 3 shows in section a portion of a toothed transmission belt according to the invention in which the pull strand is built up of polyurethane with fiber inserts, whereas the teeth are built up of fiber-free polyurethane.

FIG. 4 illustrates highly enlarged a longitudinal section through a belt according to FIG. 1 and illustrates the preferred fiber orientation in the moving direction of the belt.

According to the present invention, it has surprisingly been found that the employment of defined inserts as reinforcements or strength carriers for instance in the form of wires, braided wires or fabrics, are not necessary and that also the tendency to deform within the range of the tooth flanks can be countered when as material for the belts polyurethanes, if desired thermoplastically processed polyurethanes, are employed which are permeated with or have interspersed therein individual fibers firmly connected with the material.

Belts according to the present invention distinguish over heretofore known belts of the general type involved by a simplified and less expensive manufacture because they can be built up without the heretofore known fabric components. The preparation and the installation of the strength-yielding fabric inserts and envelopes, and also the winding up of cord threads extending in the longitudinal direction of the belt upon the unvulcanized belt or mold represent particularly costly processes and make the finishing of the belt rather expensive in view of the pre- and post-processing operations. The replacement of fabric inserts when producing high stress subjected rubber articles, by felts or fleece of natural fibers had to be discarded from the very start as far as transmission belts are concerned. This is due to the fact that while such fibers also structurally are sufficiently and mechanically anchored in the rubber mixture, they do not yield the necessary strength. On the other hand, fibers of natural origin, especially cotton fibers, have the tendency to form balls and to felt in an undesired manner, and it was due to these properties that heretofore it was generally assumed that only reinforcing inserts in a strongly definable arrangement such as in fabric form could be employed in driving belts.

Preferably, fibers of particularly high structural strength and tear resistance are employed which contain groups adapted to react with isocyanates, As an example there may be mentioned polyamide fibers. When suitably selected, such fibers exert a double function in the elastomeric material inasmuch as they first act as interlinking means, in other words, react with the isocyanate through their reactive groups while interlinking molecules and in view of maintaining their fiber structure and their preferably at random arrangement while being approximately uniformly distributed in the elastomers serve as strength carriers and increase the strength while limiting the stretchability. Furthermore, also the so-called flow is reduced.

The strength as well as the extensibility, the coefficient of elasticity and the flexibility of a belt according to the present invention may be varied within wide limits by varying the type and quantity of the employed fibers and of the isocyanate component in the polyurethane. In this way, it is possible to adapt the belt to the forces and conditions and also to possible shock loads as they may occur in operation.

Advantageously, fibers of a medium individual staple length of from 0.1 to 10 millimeters are employed. While shorter fibers have an interlinking effect, they do, however, not assure the strength to the desired extent. Fibers with a larger staple length than 10 millimeters are as a rule during the intermixing operation decreased by mechanical forces to such an extent that the length of the individual fiber varies greatly and that definable properties can be realized only under great difficulties. The proportion of the fibers in the mixture is advantageously from 5 to 50% of the total mixture. A value below 5% does not contribute anything to the increase in the strength while an increase of the fiber weight beyond that of the elastomeric component brings about a disadvantageous hardening and stiffening of the belt.

A belt according to the present invention may be produced in confromity with the process customary for polyurethanes, i.e. by casting, pressing or injection molding. When belts with two ends are to be produced, the injection molding operation is suitable. With the manufacturing process in which a flow of the material occurs—this is particularly the case when injection molding and extrusion pressing and on the calendar in view of the so-called calender effect—a more or less strong orientation of the individual fibers in the direction of flow occurs. As a result thereof, the strength in flow direction is increased further. This effect may also be taken into consideration when designing the shape of the belt, for instance when it is designed to obtain the maximum strength in the direction in which the belt will eventually move.

The above mentioned fibers should be so selected that their melting point is located above the processing temperature of the polyurethanes, for instance when injection molding, in order to make sure that at higher temperatures the fiber structure is not lost by melting. An employment of fibers with lower melting points would lead to a blending of polyamide and polyurethane which blending would be inferior with regard to the improved properties especially flexibility and less extensibility as obtained by the present invention in view of maintaining the fiber structure. The employed fibers are advantageously during the production of the polyurethane mixed in in liquid phase, i.e. at a time at which the poly addition reaction has advanced already considerably but has not yet been completed. It is also possible within the framework of the present invention to admix the fibers for instance to the granulate in the loading funnel of the injection molding machine. In this way, a homogenizing and intimate intermixture will be assured in the worm of the injection molding machine.

As fibers may be used primarily the atom groups in the molecule which are adapted to react with isocyanates, as for instance the polyamides. However, also glass fibers react by means of their OH groups always present in the surface, in an analogous manner so that when employed in the above mentioned individual staple length, they will have similar effects on the finished product.

Without abandoning the fundamental concept of the present invention, it is also possible to employ fibers which by themselves do not contain any reactionable groups as for instance polyester fibers. In this instance, it is necessary to prepare the fibers. When employing polyester fibers, this preparation is advantageously effected with isocyanates. The isocyanate groups which will then be still free on the fiber surface are then calculated into the recipe for the addition of polyurethane inasmuch as either the quantity of isocyanate is reduced or the quantity of polyester or interlinking substance is increased. A belt produced in this manner with such fibers will substantially have the advantageous properties obtainable by the present invention even though they might not be fully obvious in all measurable sizes. With such operations, in cases in which particularly high strength properties as they are common to polyurethanes are not necessary, also other polymers are for instance the less expensive synthetic rubbers may be employed.

The invention will now be explained in connection with some specific examples:

*Example I*

1000 grams of a polyester of neopentylgylcol, hexandiol and adipic acid with a hydroxyl number of approximately 56 are at a temperature of 120° C. intermixed with 150 grams of 1,4-butanediol. Into this mixture, there are stirred 600 grams of 4,4'-diphenolmethane-diisocyanate in liquid form (50° C.). With this mixture there are intermixed 700 grams of polyamide short fibers with a staple length of from 0.1 millimeter to 10 millimeters and a titer of 20 den. which fibers have previously been subjected to a grinding operation for dissolving the staple packets. The thus obtained mass is spread on metal sheets, is then after having cooled off comminuted in a granulating device and finally by means of an injection molding operation is processed to form driving belts according to the present invention.

It is to be noted that in this way, endless toothed belts as well as flat belts, round belts or V-belts may be produced in one working operation. It is also possible when employing a wide slot nozzle to produce endless driving belts or conveyor belts of considerable width. These belts may in a manner known per se be provided with any desired profiles.

*Example II*

1000 grams of a polyester of neopentylglycol, hexandiol and adipic acid with a hydroxyl number of approximately 56 are at a temperature of 120° C. intermixed with 180 grams of butaleneglycol, and into this mixture there are stirred 700 grams of diphenylmethane-diisocyanate. As soon as the diphenylmethane-diisocyanate has melted and has been uniformly distributed, 350 grams of glass fibers with an intermediate staple length of approximately 0.2 millimeter are added and intermixed therewith. Subsequently, the mass is spread on metal sheets, and, after having cooled off, is granulated. The further processing is effected as set forth in Example I by injection molding and extrusion to form toothed or non-toothed belts.

*Example III*

1000 grams of a thermoplastic polyurethane according to Example I but without a fiber content are in the form of a granulate intimately intermixed with 200 grams of polyamide short fibers and then the thus obtained mixture is introduced into the inlet funnel of an injection molding machine with worm plasticizing. In the said worm, the polyurethane will be melted at approximately 180° C. and will be intimately mixed with the polyamide which at this temperature is still unchanged in its fiber structure.

The physical numbers of the belts obtained according to the above mentioned embodiments I to III are compiled in the following table:

|  | Example | | | Without addition of fibers |
|---|---|---|---|---|
|  | I | II | III |  |
| Density (g./cm.³) | 1.24 | 1.30 | 1.26 | 1.20 |
| Strength (kp./cm.²) according to German standards 53–504 | 416 | 430 | 395 | 320 |
| Extension (percent) according to German standards 53–504 | 10 | 22 | 40 | 650 |
| Shore hardness A | 98 | 96 | 95 | 90 |
| Shore hardness D according to German standards 53–505 | 58 | 53 | 49 | 43 |
| Shock elasticity (percent) according to German standards 53–512 | 31 | 28 | 33 | 37 |
| Further tear resistance (kp./cm.²) according to German standards 53–507 | 68 | 82 | 62 | 55 |
| Wear (mm.³) according to German standards 53–516 | 60 | 72 | 45 | 40 |

The values listed in the last column for purposes of comparison refer to a polyurethane according to the Example I, with which, however, instead of the fiber content there has been employed a higher proportion of butyleneglycol, namely 162 parts by weight, in order to obtain a comparable degree of interlinking.

In instances in which in view of the stress exerted upon the driving belt it is desirable to have the properties stepped over the cross section—this is in particular the case with toothed belts and with V-belts—a multilayer structure of mixtures of different fiber contents is possible and obtainable. Thus, for instance, a layer having a high fiber content may be designed as tension section or pull strand and may be covered by an extensible, and, if desired, fiber-free top and bottom layer. It is also possible within the concept of the present invention with a driving belt having a textile pull strand of customary type to provide individual layers of polyurethane elastomers reinforced in conformity with the present invention. In this instance, advantage can be taken of, for instance, the lower deformation at locally effective loads as they occur with toothed belts within the range of the teeth.

Embodiments of belts made according to the present invention are illustrated by way of example in the accompanying drawing in which FIG. 1 illustrates a toothed driving belt which has been injection molded and which does not contain any conventional pull strand or reinforcing inserts. This belt has no layer structure so that its manufacture is particularly simple.

The drive belt section shown in FIG. 2 is provided with a conventional pull strand or reinforcing insert means 1 while the teeth 2 intended to mesh with gears (not shown) are for purposes of maintaining their shape are built up of polyurethanes with fiber addition in conformity with the present invention. The layer 3 which covers the pull strand 1 is built up of a polyurethane elastomer without the addition of fibers.

The belt section shown in FIG. 3 and provided with teeth has a pull strand 4 which consists of polyurethane with the addition of fibers built up in conformity with the present invention, whereas the teeth 5 are built up of a fiber-free polyurethane.

FIG. 4 illustrates in a considerable enlargement a longitudinal section through a belt according to FIG. 1 and shows the preferred fiber orientation in the direction in which the belt will eventually move.

It is, of course, to be understood that the present invention is, by no means, limited to the particular belts illustrated in the drawings and the methods set forth in the description but also comprises any modifications within the scope of the appended claims. Thus, the present invention is not limited to the transmission of torques between rotating machine parts but is also suitable for conveyor belts and the like, and the terms "driving belt" and "transmission belt" as they appear in this application are also intended to include conveyor belts and other types of belts.

The principle of the present invention can also be taken advantage of in other fields of the technique where the absorption of high pulling and tensional stresses is involved as for instance in connection with the manufacture of diaphragms, air spring bellows, pneumatic tires, etc.

What we claim is:

1. A transmission belt having a longitudinally extending portion consisting at least partially of polyurethane elastomeric material having individual fibers in an at-random position substantially uniformly dispersed therein and chemically reacted with an isocyanate group of said polyurethane.

2. A belt according to claim 1, in which said fibers are of polyamide material.

3. A belt according to claim 1, in which said fibers have a mean staple length of from 0.1 to 10 millimeters.

4. A belt according to claim 1, in which the polyurethane elastomeric material is thermoplastically processed.

References Cited

UNITED STATES PATENTS

| | | | |
|---|---|---|---|
| 2,461,654 | 2/1949 | Nassimbene | 74—232 |
| 3,122,934 | 3/1964 | Fihe | 74—232 |
| 3,156,128 | 11/1964 | Williams | 74—232 |
| 3,190,137 | 6/1965 | Adams | 74—233 |
| 3,291,288 | 12/1966 | Haustovich | 74—231 XR |

FOREIGN PATENTS 737,462  9/1955  Great Britain.

FRED C. MATTERN, JR., *Primary Examiner.*

J. A. WONG, *Assistant Examiner.*